United States Patent
Wiest et al.

(10) Patent No.: US 8,104,359 B2
(45) Date of Patent: Jan. 31, 2012

(54) ULTRASONIC MASS FLOW RATE MONITORING DEVICE WITH ULTRASONIC SENSOR TRANSMITTING/RECEIVING SIGNALS ALONG DEFINED SOUND PATHS OF DIFFERENT LENGTHS

(75) Inventors: Achim Wiest, Weil am Rhein (DE); Andreas Berger, Reinach (CH); Oliver Brumberg, Rheinfelden (DE)

(73) Assignee: Endress + Hauser Flowtec AG, Reinach (CH)

( * ) Notice: Subject to any disclaimer, the term of this patent is extended or adjusted under 35 U.S.C. 154(b) by 437 days.

(21) Appl. No.: 12/083,215

(22) PCT Filed: Sep. 7, 2006

(86) PCT No.: PCT/EP2006/066122
§ 371 (c)(1),
(2), (4) Date: Jul. 30, 2009

(87) PCT Pub. No.: WO2007/039394
PCT Pub. Date: Apr. 12, 2007

(65) Prior Publication Data
US 2010/0024570 A1    Feb. 4, 2010

(30) Foreign Application Priority Data
Oct. 5, 2005    (DE) .......................... 10 2005 047 790

(51) Int. Cl.
*G01F 1/66*    (2006.01)
(52) U.S. Cl. .................................................. 73/861.27
(58) Field of Classification Search .................. None
See application file for complete search history.

(56) References Cited

U.S. PATENT DOCUMENTS

| | | | |
|---|---|---|---|
| 3,940,985 A | 3/1976 | Wyler | |
| 4,103,551 A | 8/1978 | Lynnworth | |
| 4,162,630 A * | 7/1979 | Johnson | 73/861.27 |
| 4,354,388 A * | 10/1982 | Diepers et al. | 73/612 |
| 5,437,194 A * | 8/1995 | Lynnworth | 73/861.27 |
| 5,515,733 A * | 5/1996 | Lynnworth | 73/861.27 |
| 5,987,997 A | 11/1999 | Roskam et al. | |
| 6,026,693 A | 2/2000 | Baumoel et al. | |
| 6,854,338 B2 * | 2/2005 | Khuri-Yakub et al. | 73/861.27 |

(Continued)

FOREIGN PATENT DOCUMENTS
DE    44 30 223 A1    3/1995
(Continued)

*Primary Examiner* — Harshad Patel
(74) *Attorney, Agent, or Firm* — Bacon & Thomas, PLLC

(57) ABSTRACT

An ultrasonic, flow measuring device having a plurality of measuring channels. At least one ultrasonic sensor is situated in a first region of a pipeline, or measuring tube; at least two ultrasonic sensors are situated in a second region of the pipeline (5), or measuring tube, in such a manner that the ultrasonic measuring signals travel through the pipeline, or measuring tube, in, or opposite to, a stream direction of the medium, on sound paths of different lengths. A transmitting stage simultaneously excites the ultrasonic sensor, or the ultrasonic sensors, of the first or second region for transmitting the ultrasonic measuring signals. Due to the different lengths of the sound paths, the receiving stage detects the ultrasonic measuring signals incoming to the ultrasonic sensors of the second or first region at separate times. The evaluating stage ascertains, on the basis of travel-time difference of the ultrasonic measuring signals on the individual sound paths, in, and opposite to, the stream direction, volume- and/or mass-flow of the medium in the pipeline, or measuring tube.

8 Claims, 4 Drawing Sheets

U.S. PATENT DOCUMENTS

| | | |
|---|---|---|
| 2004/0011141 A1 | 1/2004 | Lynnworth |
| 2004/0176917 A1 | 9/2004 | Molenaar |
| 2006/0052963 A1* | 3/2006 | Shkarlet .................. 702/108 |

FOREIGN PATENT DOCUMENTS

| | | |
|---|---|---|
| DE | 197 22 140 A1 | 12/1997 |
| DE | 101 05 962 A1 | 4/2002 |
| DE | 101 07 292 A1 | 4/2002 |
| DE | 101 45 565 A1 | 4/2003 |
| DE | 101 58 947 A1 | 6/2003 |
| DE | 103 28 294 A1 | 1/2005 |
| EP | 1 134 559 A2 | 9/2001 |
| FR | 2 781 047 A1 | 1/2000 |

* cited by examiner

ULTRASONIC MASS FLOW RATE MONITORING DEVICE WITH ULTRASONIC SENSOR TRANSMITTING/RECEIVING SIGNALS ALONG DEFINED SOUND PATHS OF DIFFERENT LENGTHS

TECHNICAL FIELD

The invention relates to an apparatus for ascertaining and/or monitoring volume- and/or mass-flow of a medium flowing through a pipeline, or measuring tube, as the case may be, of inner diameter Di in a stream direction S. The apparatus includes: a plurality of ultrasonic sensors, which transmit and/or receive ultrasonic measuring signals along defined sound paths in, and opposite to, the flow direction of the medium; and a control/evaluation unit having a transmitting stage, a receiving stage and an evaluating stage.

BACKGROUND DISCUSSION

Ultrasonic flow measuring devices are often utilized in process- and automation-technology for detecting volume- and/or mass-flow of a medium through a pipeline. The medium can be a gaseous, vaporous or liquid medium.

Classified on the basis of mounting options, there are two types of ultrasonic, flow measuring devices: Inline, ultrasonic, flow measuring devices, which are usually mounted via flanges into the pipeline, and clamp-on, flow measuring devices, which are applied externally on the pipeline and measure volume- or mass-flow through the wall of the tube, or pipe—thus measuring non-invasively. Clamp-on flow measuring devices are described, for example, in EP 0 686 255 B1, U.S. Pat. No. 4,484,478, DE 43 35 369 C1, DE 298 03 911 U1, DE 4336370 C1 or U.S. Pat. No. 4,598,593.

As regards measuring methods, two different principles are used: Flow measuring devices ascertaining flow via the travel-time difference of ultrasonic, measurement signals in, and opposite to, the flow direction, and flow measuring devices, which win the flow-information from the Doppler shift of the ultrasonic measuring signals. In the case of ultrasonic-measuring devices working on the basis of the travel-time difference method, the ultrasonic-measuring signals are radiated at a predetermined angle, via a coupling element, into, and out of, the pipeline, in which the medium is flowing. In such case, the ultrasonic sensors are usually so arranged, that the traversing sound paths are directed through the central region of the pipeline, or measuring tube, as the case may be. The ascertained, measured value of flow reflects, thus, the average flow of the medium in the pipeline.

In the case of many applications, especially in the case of flow measurements in pipelines of large nominal diameter, this simple averaging is, however, too inaccurate. Alternatively, therefore, it is known to provide a number of pairs of ultrasonic sensors distributed on the periphery of the measuring tube or pipeline, whereby information concerning flow becomes available from different, sectional, angular ranges of the measuring tube pipeline.

The essential component of an ultrasonic sensor is its piezoelectric element. The essential component of a piezoelectric element is a piezoceramic layer metallized in at least one section thereof. Especially, the piezoceramic layer is a film, or a membrane, or diaphragm. By applying an electrical, exciting signal, the piezoceramic layer is caused to oscillate and radiates, via a coupling element, an ultrasonic measurement signal of defined signal form at an angle of incidence into the pipeline. The receiving of the ultrasonic measuring signal after passing through the pipeline is accomplished in reverse manner.

Of course, manufacturing costs for a multi-channel, flow measuring device lie significantly above the costs for a single-channel, flow measuring device.

SUMMARY OF THE INVENTION

An object of the invention is to provide a cost-favorable, multi-channel, ultrasonic, flow measuring device.

The object is achieved by features, including that: at least one ultrasonic sensor is arranged in a first region of the pipeline, or measuring tube; at least two ultrasonic sensors are arranged in a second region of the pipeline, or measuring tube, in such a manner that ultrasonic measuring signals travel through the pipeline, or measuring tube, in, or opposite to, the flow direction of the measured medium on sound paths of different length; a transmitting stage excites the ultrasonic sensor, or ultrasonic sensors, of the first or second region simultaneously for transmitting the ultrasonic measuring signals; a receiving stage, due to the different lengths of the sound paths, detects incoming ultrasonic measuring signals at the ultrasonic sensors of the second or first region at different times; and the evaluating stage, based on travel-time difference of ultrasonic measuring signals in, and opposite to, the flow direction on the individual sound paths, ascertains volume- and/or mass-flow of the medium in the pipeline, or measuring tube. According to the invention, thus, a multi-channel, ultrasonic flow measuring device with simultaneous exciting of ultrasonic measurement signals is provided, wherein the ultrasonic measuring signals travel through the measuring tube, or pipeline, on different sound paths.

In an advantageous further development of the apparatus of the invention apparatus, it is provided, that the ultrasonic sensor applied in the first region is an ultrasonic sensor having a radiation characteristic, which is so formed, that the ultrasonic measuring signals transmitted by such ultrasonic sensor are received by the ultrasonic sensors in the second region.

Alternatively, it is provided, that the ultrasonic sensor applied in the first region is an ultrasonic sensor, in which a plurality of transmitting/receiving units are arranged in an array, and the transmitting/receiving units are so operable, that they transmit, simultaneously, ultrasonic measuring signals at different angles of incidence into the pipeline, or measuring tube, and these ultrasonic measuring signals are subsequently received by the ultrasonic sensors in the second region. Then, for the purpose of travel-time difference measurement, the process is reversed.

Moreover, it is provided, that at least two ultrasonic sensors are arranged in a unit, and the unit is mounted in an opening in the first region of the measuring tube and/or in the second region of the measuring tube. A corresponding apparatus is described in the not pre-published patent application DE 102005003398.7. The content of such patent application is incorporated herein by reference.

An advantageous embodiment of the apparatus of the invention provides that, for the case, in which a plurality of ultrasonic sensors are present in the first region of the pipeline, or measuring tube, that these are arranged on a line parallel to the longitudinal axis of the pipeline or measuring tube.

Preferably, the ultrasonic sensor, or ultrasonic sensors, in the first region of the pipeline, or measuring tube, is/are positioned in such a manner, that it, or they, radiates/radiate the ultrasonic measuring signals at different angles of radiation into the pipeline, or measuring tube.

Viewed as especially advantageous is the embodiment wherein two ultrasonic sensors are arranged or oriented/operated in such a manner, that they radiate the ultrasonic measuring signals into the pipeline, and/or receive the ultrasonic measuring signals from the pipeline, in a radial direction, and that the control/evaluation unit ascertains, on the basis of the travel time of the ultrasonic measuring signals on the resulting diametral sound path, the velocity of sound in the measured medium.

In an advantageous embodiment of the apparatus of the invention, the ultrasonic sensors lie in a plane; the ultrasonic measuring signals are simultaneously radiated at different angles of incidence into the pipeline and/or received from the pipeline.

Preferably, the ultrasonic sensors lie in a plane, whereby a measuring of the flow profile of the medium in the pipeline is possible approximately at the same time. Moreover, more precise information is made available by the flow measuring device of the invention than in the case of conventionally, sequentially operating flow measuring devices. This is true even in the case of very different flow conditions in the pipeline.

An advantageous further development, especially for the case of ultrasonic flow measuring devices with small nominal diameters, is that wherein each ultrasonic sensor has its own receiving amplifier. Especially, in the case of ultrasonic flow measuring devices with small nominal diameters, the travel time of the measuring signals is small in comparison with the reverberation time of the ultrasonic sensor, so that measuring performance is significantly, when the ultrasonic measuring signals are first amplified and then compared.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
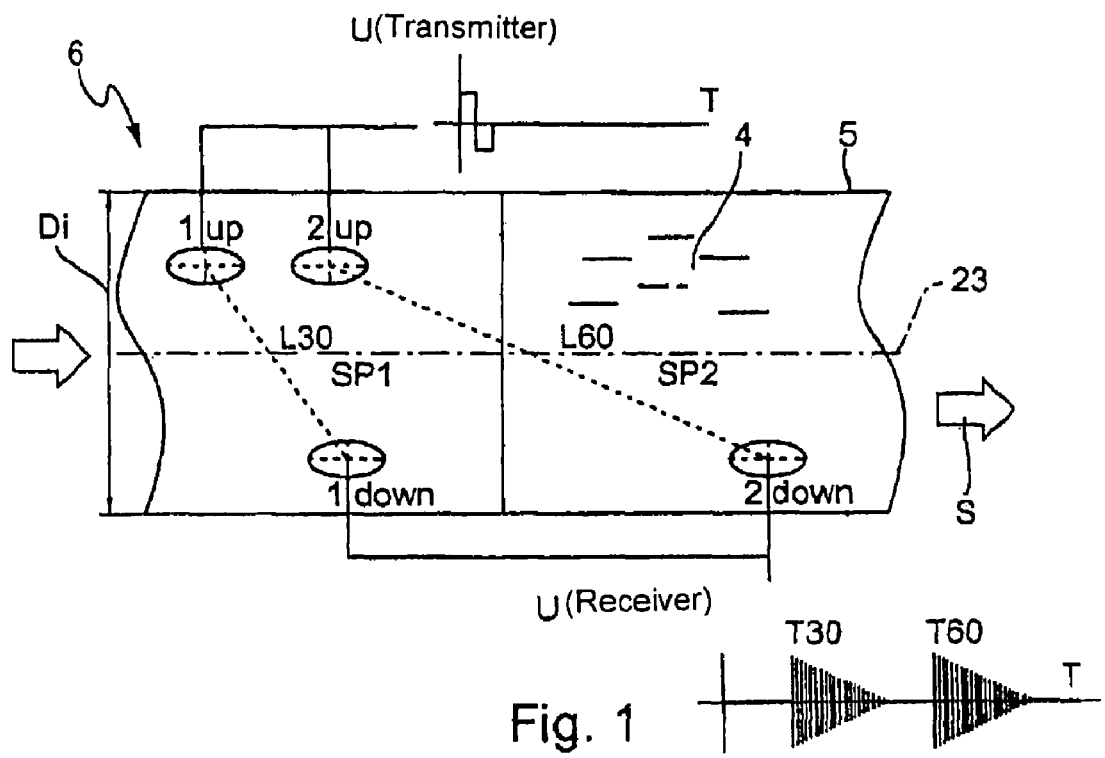
FIG. 1 is a schematic drawing of a first embodiment of the ultrasonic transducer of the invention.

Before discussing the figures in detail, there follow some general observations: Multi-channel ultrasonic flow measuring devices working according to the travel-time difference method operate based on a comparison of travel time tup, in the stream direction S, and travel time tdn, opposite to the stream direction S. Additionally, the inner diameter Di plays a role, via the area A of the pipeline 5, or measuring tube 5. Likewise, the angle $\alpha$ (in FIGS. 1 and 2, the angles $\alpha$ of incidence and emergence are $\alpha=30°$ and $\alpha=60°$) of the sound beam relative to the flow rate Q, and the lengths L30 or L60 of the sound paths SP in the medium 4 flowing with the velocity v are taken into consideration. The correction factor k is dependent on the relative radial offset rO of the sound beam from the axis of the pipeline 5, or measuring tube 5.

Mathematically, the flow rate Q can be described by the following equation:

$$Q = k * A * v = k * \frac{\pi}{4} * Di^2 * L * \frac{t_{up} - t_{dn}}{(t_{up} * t_{dn}) * 2 * \cos\alpha} \quad (1)$$

$$L = \frac{1}{\cos\alpha} Di * \sqrt{1 - rO^2} \quad (2)$$

For calculating flow rate Q in the case of known angle $\alpha$, it does not matter, to a first approximation, whether the radiation in and out is with an angle $\alpha$ of 30° or 60° relative to the stream direction S of the medium 4. The correction factor k of the ratio of measured velocity v on the sound path SP to the average velocity over the cross section A of the pipeline 5 does not change, in such case. In order e.g. to measure with two sound beams, such as in the case of the PROline Prosonic Flow 93 C—Inline device available from the assignee, one sensor pair (1up, 1dn) can be mounted at 30° and the other sensor pair (2up, 2dn) at 60° relative to the stream direction S. The correction factor k is, for turbulent flow profile and a radial offset rO of the ultrasonic sensors of 52%, approximately 1. The sound path lengths of the ultrasonic measuring signals for $\alpha=30°$ and $\alpha=60°$ and an inner diameter Di of the pipeline 5 of e.g. 1000 mm are, thus:

$$L_{30} = \frac{1}{\cos(30°)} * 1000 \text{ mm} * \sqrt{1 - 0.52^2} = 986 \text{ mm} \quad (3)$$

and $$L_{60} = \frac{1}{\cos(60°)} * 1000 \text{ mm} * \sqrt{1 - 0.52^2} = 1708 \text{ mm} \quad (4)$$

In the case of a velocity of sound $c_M$ of e.g. 1500 m/s in water as the medium 4, the travel times T of the ultrasonic measuring signals in the pipeline 5 are:

$$T_{30} = \frac{L_{30}}{c} = \frac{0.986 \text{ m}}{1500 \text{ m/s}} = 657 \,\mu\text{sec} \quad (5)$$

and $$T_{60} = \frac{L_{60}}{c} = \frac{1.708 \text{ m}}{1500 \text{ m/s}} = 1139 \,\mu\text{sec} \quad (6)$$

Figure 3:
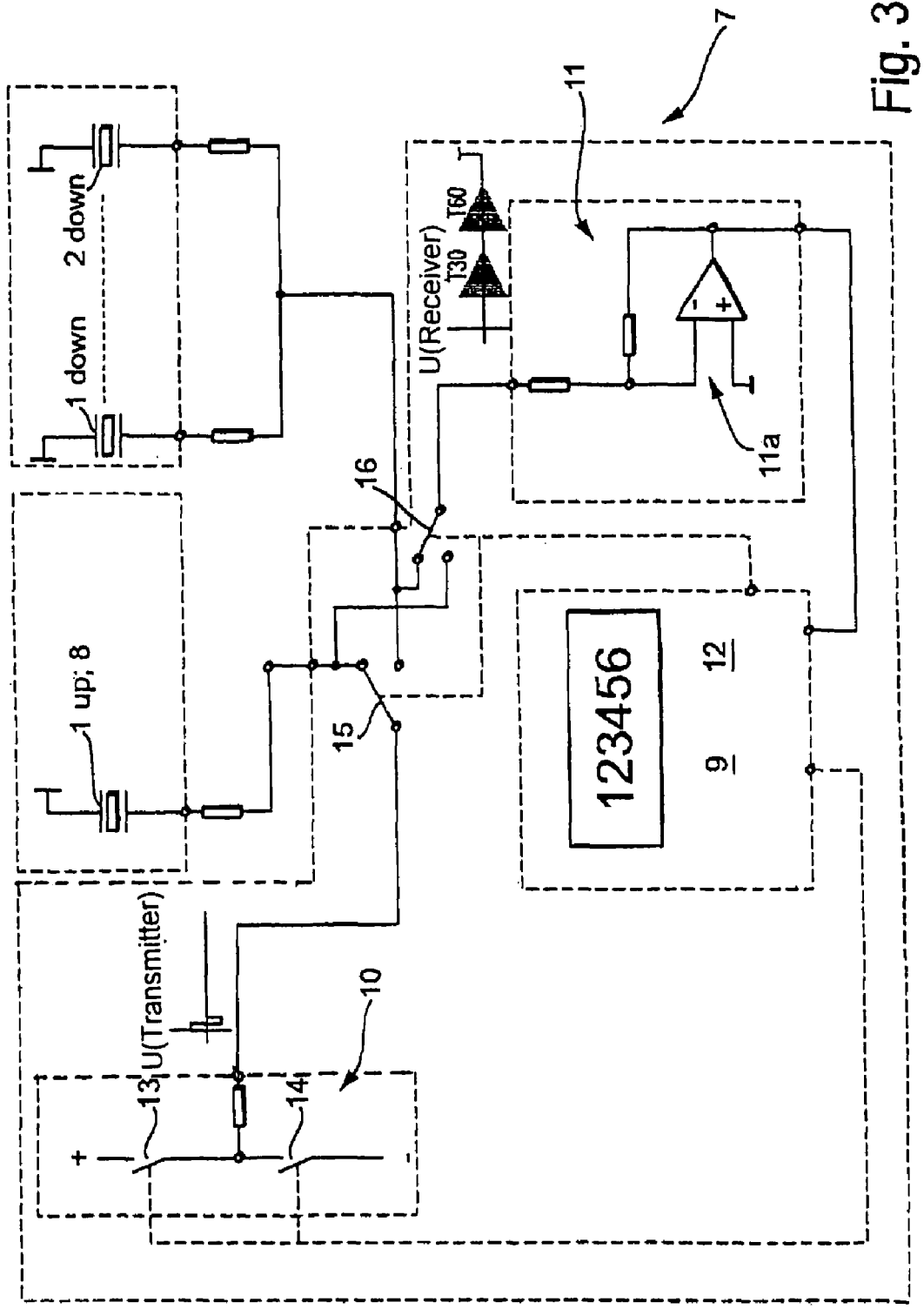
FIG. 3 is a block diagram of the apparatus of the invention with application of the ultrasonic transducer shown in FIG. 2.
Figure 5:
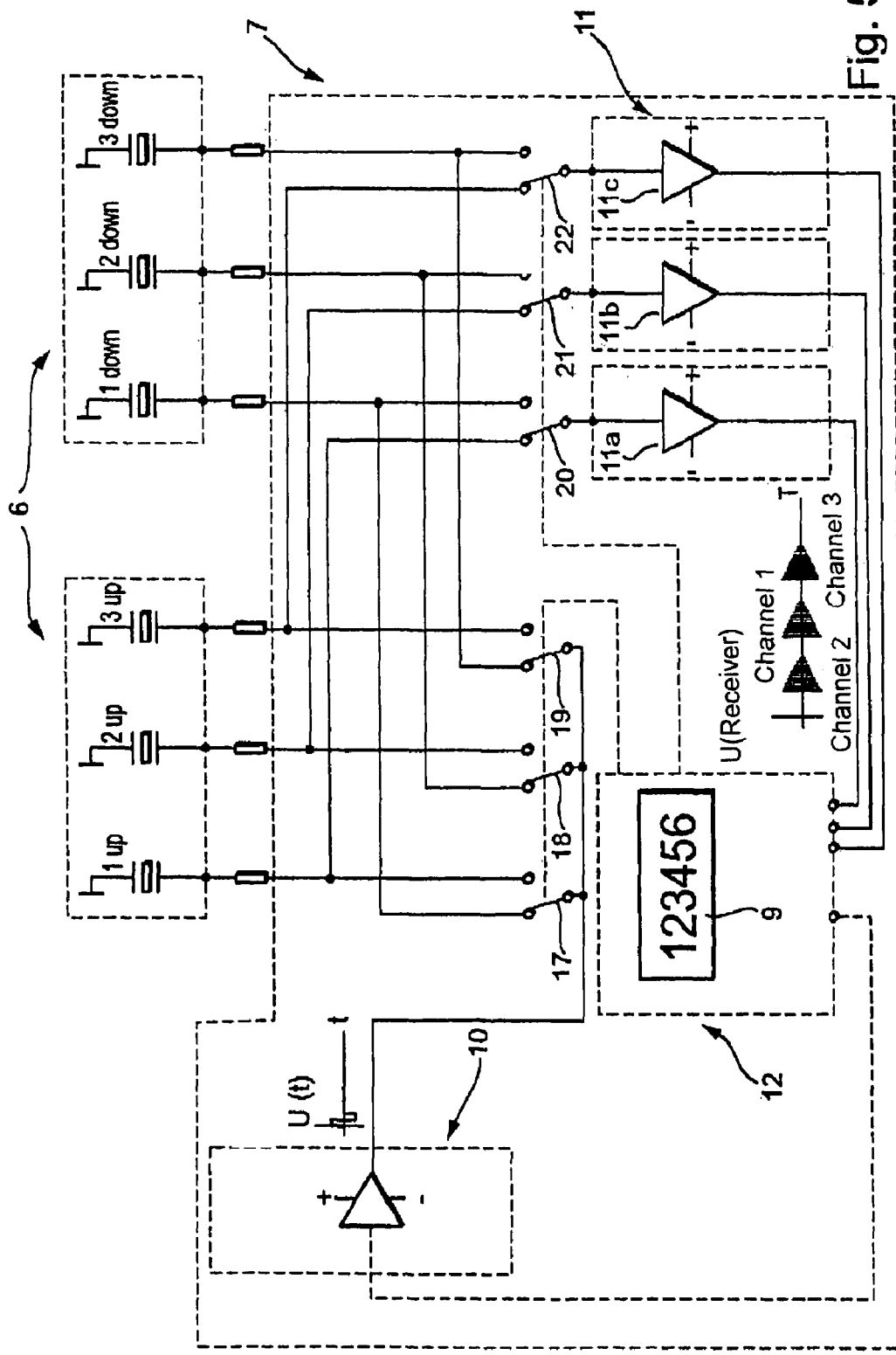
FIG. 5 is a block diagram of the apparatus of the invention with application of the ultrasonic transducer shown in FIG. 4.

An ultrasonic measurement signal achieves, in the case of an exciter frequency of 1 MHz, a typical decay time of about 100 µsec or about 1‰ of maximum. With special matching, or exciting, of the ultrasonic sensors 1up, 2up, 3up; 1d, 2dn, 3dn, essentially shorter decay times are attainable. A main idea of the solution of the invention is to excite, via a parallel circuit, an array of, or at least two, transmitting ultrasonic sensors 8; 1up, 2up with one transmitting pulse U(t). In the embodiments of FIGS. 3 and 5, the transmitting pulse U(t) is rectangular.

The transmitting ultrasonic sensors 8; 1up, 2up are situated e.g. on the pipeline 5 in the direction of the inlet, while the receiving ultrasonic sensors 1dn, 2dn; 8 are situated in the direction of the outlet, of the pipeline 5. The received signals of the two ultrasonic sensors 1dn, 2dn; 8 are fed in parallel to a summing amplifier 11.

Since the duration of a received signal is small in comparison to the time separation of the two travel times, $$T_{30} - T_{60} = 482 \,\mu\text{sec}, \quad (7)$$

the different sound paths SP at 30° and 60° can be distinguished very well via their travel times T30, T60. Thus, it is possible to work with one transmitting stage 10 acting in parallel on all transmitting ultrasonic sensors 1up, 2up, 3up; 8, and with one receiving stage 11 summing all ultrasonic-measuring signals of the receiving ultrasonic sensors 1dn, 2dn, 3dn; 8. Via a matching evaluation, the times $t_{up30}$ and $t_{up60}$ for the corresponding sound paths SP are ascertained in simple manner by working with time windows calculated for a certain, angularly dependent, sound path SP and a certain velocity of sound. For example, the time windows lie between 600 . . . 700 μsec and between 600 . . . 1200 μsec.

The aforementioned example relates to two pairs of ultrasonic sensors 1up, 2up; 1dn, 2dn. Of course, is it also possible to increase the number of pairs of ultrasonic sensors 1up, 2up; 1dn, 2dn. In such case, it is to be assured, that the decay time is always smaller, for example, than the time separation of the travel times given in Equation 7.

Furthermore, it is provided, that a sound path SP crosses the medium 4 perpendicularly to the stream direction S. Via the travel time of the ultrasonic measuring signals on this perpendicular sound path SP, the current sound velocity of the medium 4 can be exactly ascertained and taken into consideration for exact calculation of the volume- or mass-flow of the medium 4 through the pipeline 5.

FIGS. 1 to 5 will now be described in detail. FIG. 1 shows a schematic drawing of a first embodiment of the ultrasonic transducer 6 of the invention, with an ultrasonic flow measuring device comprising a transducer 6, or sensor, and a so-called transmitter 7, which contains the electronics part. Transducer 6 has two ultrasonic sensors 1up, 2up, which are situated in the direction of the inlet of the pipeline 5, and two ultrasonic sensors 1dn, 2dn, which are situated in the direction of the outlet of the pipeline 5. The two ultrasonic sensors 1up, 2up are supplied, in parallel, with a transmitting pulse U(t). Due to the different travel times T30, T60 on the two sound paths SP1, SP2 of lengths L30, L60 traversing the pipeline 5, the corresponding ultrasonic measuring signals of the two ultrasonic sensors 1dn, 2dn are detected spaced in time. The transmitting and receiving of the ultrasonic measuring signals in the reverse direction, thus opposite to the stream direction S, is accomplished analogously.

Figure 2:
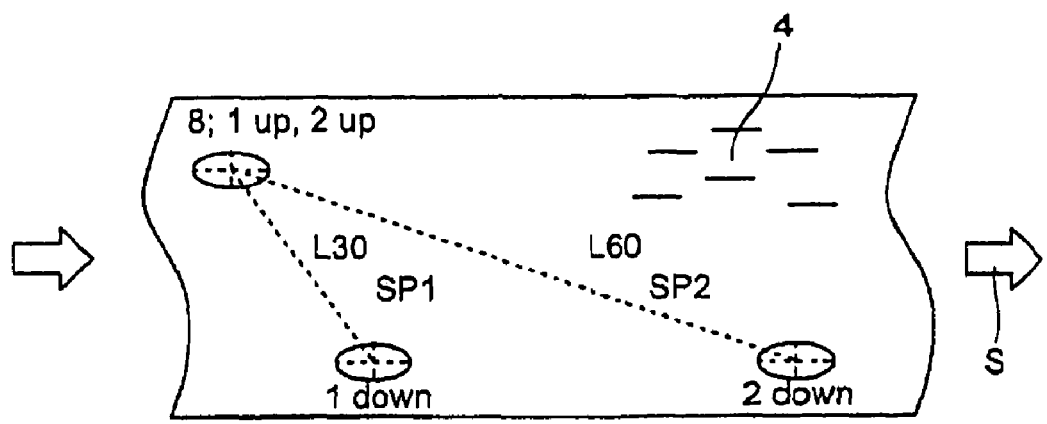
FIG. 2 is a schematic drawing of a second embodiment of the ultrasonic transducer of the invention.

The schematic drawing of a second embodiment of the ultrasonic-transducer 6 of the invention shown in FIG. 2 differs from that shown in FIG. 1 as regards the special embodiment of the sensor array 8 situated in the direction of the inlet of the pipeline 5. This sensor array 8 is so driven, that it radiates the ultrasonic measuring signals likewise in parallel at different angles α into the pipeline 5, through which the medium 4 is flowing, or, as the case may be, receives the ultrasonic measuring signals from the pipeline 4, offset in time, at the different angles α.

FIG. 3 is a block diagram of the transmitter 7 of the apparatus of the invention connected with the ultrasonic transducer 6 of FIG. 2. By closing of the switch 13, the transmitting pulse U(t) is applied to the ultrasonic sensor 8. Ultrasonic sensor 8 is, for example, an electronically operable, sensor array, which radiates the ultrasonic measuring signals at two different angles, α30, α60, into the pipeline 5. The switches 13, 14 represent a simple driving circuit for the piezoelectric elements of the ultrasonic sensors 1, 2, 3. The particular switch positions are generated in the counter and control logic 9. In this way, a desired rectangular signal can be produced with few components. Simultaneously with the closing of the switch 13, also the counter 9 is activated. Via the counter 9, which, in the illustrated case, is integrated into the evaluating stage 12, the receiving stage 11 becomes active in certain time windows via corresponding closing of the switch 16, and the two ultrasonic, measuring signals traveling on the different sound paths SP1, SP2 are detected by the two ultrasonic sensors 1dn, 2dn. The travel times T30, T60 in the stream direction S are ascertained by the evaluating stage 12 via read-out of the counter 9. For ascertaining the travel-time difference, which represents a measure for the volume-flow of the medium 4 through the pipeline 5, the process is then reversed. Since, in the case illustrated in FIG. 3, the travel times T30, T60 of the ultrasonic measuring signals on the two sound paths SP1, SP2 have a sufficiently large separation from one another, one receiving amplifier 11a in the evaluating stage 11 is sufficient for detection of both of the received, ultrasonic measuring signals.

Figure 4:
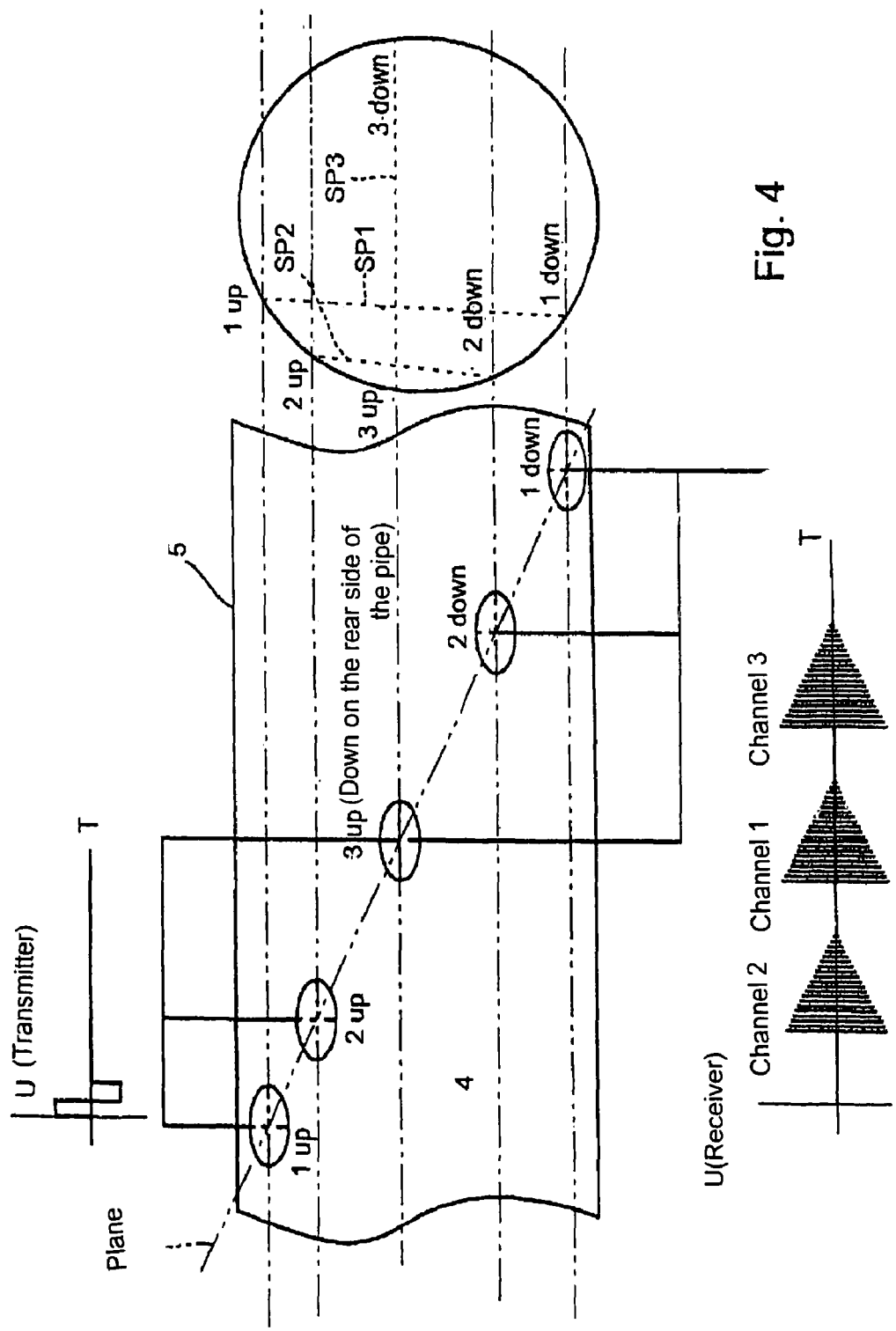
FIG. 4 is a schematic drawing of a third embodiment of the ultrasonic transducer of the invention.

FIG. 4 shows a schematic drawing of a third embodiment of the ultrasonic transducer 6 of the invention, while FIG. 5 is a block diagram of a transmitter 7, which is preferably used in connection with the ultrasonic transducer 6.

The ultrasonic flow-measuring device illustrated in FIGS. 4 and 5 has three ultrasonic sensors 1up, 2up, 3up, which are situated in the direction of the inlet of the pipeline 5, and three ultrasonic sensors 1dn, 2dn, 3dn, which are situated in the direction of the outlet of the pipeline 5. The arrangement of the ultrasonic sensors 1up, 2up, 3up; 1dn, 2dn, 3dn is so selected, that they lie in a plane. The routes of the corresponding sound paths SP1, SP2, SP3 are likewise shown in FIG. 4. Due to the different travel times on the individual sound paths SP1, SP2, SP3, the ultrasonic measuring signals of the ultrasonic sensors 1dn, 2dn, 3dn are detected offset in time. In the illustrated case, each of the ultrasonic sensors 1dn, 2dn, 3dn is connected with its own receiving amplifier 11a, 11b, 11c, while, in the reverse case, each of 1up, 2up, 3up is connected with its own one of the same set of receiving amplifiers 11a, 11b, 11c. As a result of the parallel, instead of sequential, reading of the ultrasonic sensors 1up, 2up, 3up; 1dn, 2dn, 3dn, even ultrasonic measuring signals rapidly following one after the other on the ultrasonic sensors 1dn, 2dn, 3dn, or, in the reverse case, on 1up, 2up, 3up, acting as receivers, can be detected with the sufficient accuracy.

The invention claimed is:
1. An apparatus for determining and/or monitoring volume- and/or mass-flow of a medium flowing in a stream direction through a pipeline, or measuring tube, comprising:
  a plurality of ultrasonic sensors which transmit and receive ultrasonic measuring signals along defined sound paths in, and opposite to, the stream direction of the medium; and
  a control/evaluation unit having a transmitting stage, a receiving stage and an evaluating stage, wherein:
  at least one of said plurality of ultrasonic sensors is situated in a first region of the pipeline, at least two of said plurality of ultrasonic sensors are situated in a second region of the pipeline, in such a manner that the ultrasonic measuring signals travel through the pipeline, on sound paths of different lengths, in, or opposite to, the stream direction of the medium;
  said transmitting stage excites one of said plurality of ultrasonic sensors or all said plurality of ultrasonic sensors of said first region simultaneously for transmitting the ultrasonic measuring signals;
  said receiving stage detects time-separated, ultrasonic, measuring signals incoming to said plurality of ultrasonic sensors of said second region, due to different lengths of the sound paths;
  and afterwards said transmitting stage excites one of said plurality of ultrasonic sensors or all said ultrasonic sen- sors of said second region simultaneously for transmitting the ultrasonic measuring signals;

said receiving stage detects time-separated, ultrasonic, measuring signals incoming to said plurality of ultrasonic sensors of said first region, due to different lengths of the sound paths; and said evaluating stage, on the basis of travel-time difference of ultrasonic measuring signals on individual sound paths in, and opposite to, the stream direction, ascertains volume- and/or mass-flow of the medium in the pipeline, and said plurality of ultrasonic sensors lie in a plane, whereby a measuring of a flow profile of the medium in the pipeline occurs approximately simultaneously, and, wherein said plane is oblique to the stream direction of the medium.

2. The apparatus as claimed in claim 1, wherein:

one of said plurality of ultrasonic sensors present in the first region is an ultrasonic sensor having a radiation characteristic, which is so formed, that the ultrasonic signals transmitted by said one of said plurality of ultrasonic sensors are received by others of said plurality of ultrasonic sensors in said second region.

3. The apparatus as claimed in claim 1, wherein:

one of said plurality of ultrasonic sensors present in said first region is an ultrasonic sensor having a plurality of transmitting/receiving units, which are arranged in an array and which are so operable, that they simultaneously transmit/receive ultrasonic measuring signals at different angles of incidence into the pipeline; and the ultrasonic measuring signals are received by said plurality of ultrasonic sensors in said second region.

4. The apparatus as claimed in claim 1, wherein:

at least two ultrasonic sensors are arranged in a unit, said unit being mounted in an opening in said first region, and/or in said second region, of the measuring tube.

5. The apparatus as claimed in claim 1, wherein:

one of said plurality of ultrasonic sensors, or a plurality of said plurality of ultrasonic sensors is situated in said first region of the pipeline, in such a manner that it/they radiates/radiate the ultrasonic measuring signals at different angles of incidence into the pipeline.

6. The apparatus as claimed in claim 1, wherein:

two ultrasonic sensors are arranged or oriented/operated in such a manner that they radiate the ultrasonic measuring signals radially into, or radially receive the ultrasonic measuring signals from, the pipeline; and said control/evaluation unit, on the basis of travel time of the ultrasonic measuring signals on a diametral sound path, ascertain velocity of sound in the medium.

7. The apparatus as claimed in claim 1, wherein:

said plurality of ultrasonic sensors lie in said plane and, simultaneously, at different angles, radiate ultrasonic measuring signals into, and/or receive ultrasonic measuring signals from, the pipeline.

8. The apparatus as claimed in claim 1, wherein:

each ultrasonic sensor has its own receiving amplifier.

* * * * *